United States Patent
Campagne et al.

(10) Patent No.: US 10,882,201 B2
(45) Date of Patent: Jan. 5, 2021

(54) METHOD FOR CONTROLLING THE MANUFACTURE OF COMPOSITE MATERIAL PARTS AND DEVICE FOR IMPLEMENTING SAME

(71) Applicant: AIRBUS GROUP SAS, Blagnac (FR)

(72) Inventors: Benjamin Campagne, Saint Herblain (FR); Gwenole Le Moal, Nantes (FR)

(73) Assignee: AIRBUS SAS, Blagnac (FR)

( * ) Notice: Subject to any disclaimer, the term of this patent is extended or adjusted under 35 U.S.C. 154(b) by 312 days.

(21) Appl. No.: 15/781,907

(22) PCT Filed: Dec. 7, 2016

(86) PCT No.: PCT/FR2016/053256
§ 371 (c)(1),
(2) Date: Jun. 6, 2018

(87) PCT Pub. No.: WO2017/098151
PCT Pub. Date: Jun. 15, 2017

(65) Prior Publication Data
US 2018/0361607 A1 Dec. 20, 2018

(30) Foreign Application Priority Data
Dec. 8, 2015 (FR) ...................................... 15 61991

(51) Int. Cl.
*B26D 5/00* (2006.01)
*B23Q 17/22* (2006.01)
(Continued)

(52) U.S. Cl.
CPC ......... *B26D 5/007* (2013.01); *B23Q 17/2233* (2013.01); *B23Q 17/249* (2013.01);
(Continued)

(58) Field of Classification Search
CPC ...... B26D 5/007; B26D 7/24; B23Q 17/2233; B23Q 17/249; B24C 1/045; B26F 3/004
See application file for complete search history.

(56) References Cited

U.S. PATENT DOCUMENTS

| 4,901,359 A | * | 2/1990 | Bruder | ..................... B26D 5/00 235/462.01 |
| 10,662,488 B2 | * | 5/2020 | Deng | ........................ C14B 5/00 |

(Continued)

FOREIGN PATENT DOCUMENTS

FR 2925377 6/2009

OTHER PUBLICATIONS

International Search Report, dated Apr. 4, 2017, priority document.

*Primary Examiner* — Dung Van Nguyen
(74) *Attorney, Agent, or Firm* — Greer, Burns & Crain, Ltd.

(57) ABSTRACT

A method and device for cutting materials for manufacturing parts according to which an image of a cutting line is made recurrently downstream from a cutting head. The images produced are analyzed in real time to calculate amplitudes of deviations in the quality of the surface profiles of the cutting line as the part is being cut and comparing the calculated amplitudes to at least one predefined threshold value. The cutting is stopped in the event of the at least one threshold value being exceeded.

15 Claims, 6 Drawing Sheets

(51) Int. Cl.
 *B23Q 17/24* (2006.01)
 *B24C 1/04* (2006.01)
 *B26F 3/00* (2006.01)
 *B26D 7/24* (2006.01)

(52) U.S. Cl.
 CPC ............... *B24C 1/045* (2013.01); *B26D 7/24* (2013.01); *B26F 3/004* (2013.01)

(56) References Cited

U.S. PATENT DOCUMENTS

| | | | |
|---|---|---|---|
| 2005/0065631 A1* | 3/2005 | Rapoza | B26D 5/005 700/135 |
| 2008/0191390 A1* | 8/2008 | Fukushima | B23K 26/146 264/400 |
| 2010/0267314 A1* | 10/2010 | Cvjeticanin | G01F 1/8468 451/2 |
| 2011/0005361 A1 | 1/2011 | Hamann et al. | |
| 2017/0136646 A1* | 5/2017 | Park | B26D 5/007 |
| 2017/0355635 A1* | 12/2017 | Li | B23K 26/402 |
| 2020/0031009 A1* | 1/2020 | Sutter | B26D 5/007 |

\* cited by examiner

METHOD FOR CONTROLLING THE MANUFACTURE OF COMPOSITE MATERIAL PARTS AND DEVICE FOR IMPLEMENTING SAME

CROSS-REFERENCES TO RELATED APPLICATIONS

This application claims the benefit of the French patent application No. 1561991 filed on Dec. 8, 2015, the entire disclosures of which are incorporated herein by way of reference.

FIELD OF THE INVENTION

The present invention relates to the field of the manufacture of parts notably made of composite materials. The invention more particularly relates to the phases for cutting out the parts in order to give them their final contours. It is applicable to the measurement and to the control of the surface profile of the cutting line during the cutting out so as to reduce the number of defective parts.

BACKGROUND OF THE INVENTION

The cutting out of parts with shapes of variable complexity may be carried out by various techniques depending notably on the nature of the material forming the part. This may include a mechanical saw system, for example when the part in question is made of wood, plasma cutting, laser cutting or cutting by electro-erosion for metal parts or by water with or without the addition of abrasives if the part is made of composite material.

The difficulty of these techniques resides in the quality of the parts produced, notably as regards the adherence to the shape of their contours which are affected by uncontrolled waviness of the cutting line. In order for a part thus cut out or formed to be acceptable, the level of waviness of the cutting line must meet very precise tolerance criteria depending on the end applications of the part. Thus, the tolerance in aeronautics may be much reduced when the application is to configure parts composing the fuselage or the wings of aircraft. However, significant deviations are sometimes observed, outside of the tolerances, given the complexity and unpredictability of the waviness phenomenon. Furthermore, no means exist that allow this waviness to be detected when it occurs and the cutting generally continues before the problem is detected. It is only when the cut-out parts are checked, if the amplitude of the waviness has exceeded the tolerances, that the part is declared defective.

Generally, the level of waviness is limited by appropriate adjustment of the machine prior to the cutting operations, but given that other poorly identified parameters are involved, such as the wear of the machine or defects or faults of its components, uncontrolled variations in waviness and in amplitudes of the waviness occur during the cutting operation.

There accordingly exists a hitherto unsolved problem for detecting these variations in waviness when they occur beyond a certain pre-defined tolerance level, and thus reducing the number of defective parts and hence limiting the scrap losses and saving time.

SUMMARY OF THE INVENTION

The precise aim of the present invention is to provide a solution to this problem by allowing a real-time monitoring of the cutting operation in such a manner as to detect the waviness at each point of the part as it is being cut out.

This aim is achieved according to the present invention by virtue of a method for cutting out materials for the manufacture of parts, characterized in that an image of a cutting line is generated in a recurrent manner downstream of the cutting head and in that the images thus produced are analyzed in real time in order to calculate amplitudes of deviations of the cutting line as the part is cut out and to compare the calculated amplitudes with at least one predefined threshold value, the cutting operation being stopped in the case of exceeding the at least one threshold value.

The method of the invention is noteworthy in that it allows the amplitude of a deviation of the cutting line to be detected and to be calculated, as the cutting progresses, with respect to the expected surface profile and thus the cutting operation to be stopped in the case of exceeding at least one predefined threshold value based on the expected surface profile.

The method of the invention is noteworthy in that it is applicable to all cutting techniques. By way of examples, mention may be made of plasma and laser cutting, cutting by electro-erosion or by water jet with or without the addition of abrasives which are chosen according to the material forming the part and the degree of finishing and of precision sought.

The invention is, in particular, aimed at a water jet cutting technique, abrasive or otherwise. This technique is mainly based on the control of the water pressure to which abrasives are potentially added depending on the hardness of the materials. The water-jet cutting technique offers numerous advantages in terms of efficiency and of quality of the parts, but it also has a few drawbacks due to the jet delay and to the waste. These drawbacks are managed in the prior art during the setup of the machine prior to or during its use using parameters such as the thickness and the hardness of the materials, the angle and the cutting speed, the water pressure, the concentration of abrasives, etc. However, these devices allow certain imperfections to be compensated but, if too large a waviness occurs, it is not managed and the part produced is defective. The method of the invention provides precisely the means to overcome this problem by progressively monitoring the correct behavior of the cutting operation by the image in such a manner as to address a stop command to the machine if the waviness is greater than a permitted threshold depending on the nature of the part.

Water-jet cutting, which is applicable to all materials except tempered glass, turns out to be very advantageous in the field of aeronautics for the cutting out of parts, even large parts, made of carbon fiber.

Thus, among the materials able to be implemented in the method of the invention may be mentioned: the thermoduric composite materials, thermoplasics, LRI, RTM, used in the manufacture of keel beams and of WLC components for aircraft wings.

The method of the invention allows, depending on the cutting technique implemented, the state of the machine used, the material cut out, and the end application of the part produced, one or more criteria to be retained that will be inspected on the images of the cutting line during the cutting operation. By way of example of quality criteria, the following components of the state of surfaces are known with respect to which the at least one threshold value of the method of the invention may be predefined:

the primary shape defects which represent long wavelength periodic components such as the error in straightness, or in circularity, whose dimension depends on the scale of the part, the waviness which represents periodic components of average wavelength; in this case, the irregularity distance between two peaks is generally in the range between around 0.5 and 2.5 mm, the roughness which represents periodic and pseudo-periodic components of short wavelength; in this case, the irregularity distance between two peaks is generally in the range between around 0.02 and 0.5 mm, the micro-roughness which represents aperiodic components corresponding to surface imperfections, whose size is generally less than 20 µm.

Thus, waviness is a sub-category of cutting deviations, other categories being shape and roughness defects.

These components of the surface profile constitute as many quality criteria as may be applied to a cutting line in such a manner as to predefine one or more threshold values whose comparison with the characteristics calculated from the images allow the cutting operation to be stopped in the case of deviations of too high an amplitude whether this be from waviness, from primary shape defects, or else too great a roughness. Thus, deviation from a surface profile, according to the present invention, is understood to mean not only the waviness as such, but, more generally, all the deviations constituting defects that might affect the cutting line with respect to one or more predefined threshold values.

The deviation may therefore arise from other undesirable components of the cutting line with respect to which the at least one threshold value of the method of the invention may be predefined, such as a non-penetrating cut, a cut that has not or has badly passed through the material, too wide or, on the contrary, too narrow a cut. The dimensions of these other components depend on the size of the parts that are being manufactured.

The analysis of the images produced generally comprises the highlighting of the contours of the cutting line, the detection of the contours, the determination of the shape guide line, such as a straight line or a polynomial, known by virtue of the planned cut-out path, then the determination of the variations around this shape line based on their wavelength.

The cutting line is filmed or photographed downstream of the cutting head over a length which varies according to the cutting technique used, the cutting speed and the material being cut out, but, generally speaking, each image produced covers a length of the cutting line which, depending on the aperture and the field covered by the camera, may be from a few mm to several cm.

Similarly, depending on the image capture device used and the distance at which the latter is placed, it is possible to achieve resolutions of the order of 0.01 mm which are easily small enough for detecting the undesirable variations of the cutting line.

These criteria, together with the needs and constraints associated with the materials and with the cutting system, allow the lens of the camera to be selected and hence the distance between the camera and the cutting line.

The method of the invention may be implemented by filming or photographing the progress of the cutting line; the difference resides in the speed of image capture and the processing of the images captured. The images may therefore be captured at intervals of time which vary as a function of the cutting speed and the field or the length of the cutting line covered by the images. Cameras offer many possibilities in this respect and the intervals may be in the range between 0.01 and 10 seconds.

The cutting line is filmed or photographed from above and/or from below the material being cut out. It is generally preferred for the images to show the underside of the cutting line, but in the tracking of certain particular criteria, such as the conicity of the cutting line, it may be useful to analyze images from above and from below the cutting line.

The method of the invention may comprise the implementation of means of illumination or of enhancement of the contrast of the images produced, such as, for example, an illumination of annular type mounted around the lens of the camera.

In one particular embodiment of the method of the invention, it may be useful to protect the camera from projections, for example of water in the case of a water-jet cutting technique. An air-jet ventilation system or a blade of the windshield wiper type may be used to guarantee the quality of the images captured.

As previously indicated, the method of the invention is especially applicable to the manufacture of parts made of composite materials for aeronautics, such as those involved in the composition of the fuselage or of the wings of aircraft.

The invention also relates to a device for the implementation of the method previously described. This is a device comprising a machine for cutting out parts, a camera disposed downstream of the cutting head in the direction of progress of the cutting line, a system for analyzing images captured with the camera, the analysis system being connected to the control system for the cutting machine in such a manner as to allow its instantaneous shutdown.

According to one preferred embodiment of the device of the invention, the camera is disposed in such a manner as to capture images of the underside of the cutting line. Thus, in the case of the implementation of a water-jet cutting machine, the camera is fixed to the collector of the cutting head and the images are captured from the side where the water from the jet is evacuated.

In order to enhance, where necessary, the quality of the images produced, the device of the invention may be equipped with:

means of illumination or enhancement of the contrast of the images produced, means of protection against projections, for example of water in the case of a water-jet cutting technique.

BRIEF DESCRIPTION OF THE DRAWINGS

Other advantages and features of the invention will become apparent from the description of the following examples given by way of non-limiting example of one particular embodiment of a method according to the invention and of a device for its implementation, in which:

FIGS. 2 to 5b show schematically the process of one example of implementation of the method, subject of the present invention, applied to the cutting lines of a part, FIG. 2 shows two cutting lines of a dual water-jet cutting out of the composite material disposed on a support, FIG. 3 shows on photos the cutting line seen by the camera of the device and the determination of the associated guide line, FIGS. 4a, 4b and 5a, 5b show the analysis of the surface profile of portions of the cut edge given in FIG. 3.

DETAILED DESCRIPTION OF THE PREFERRED EMBODIMENTS

The invention is described in a detailed manner in the case of the water-jet cutting technique for a part made of composite material 1. The method would be equally applicable, with suitably designed means, to any technique for cutting out a material by a method that would be likely to generate uncontrolled waviness or deviations of the cutting line.

Figure 1:
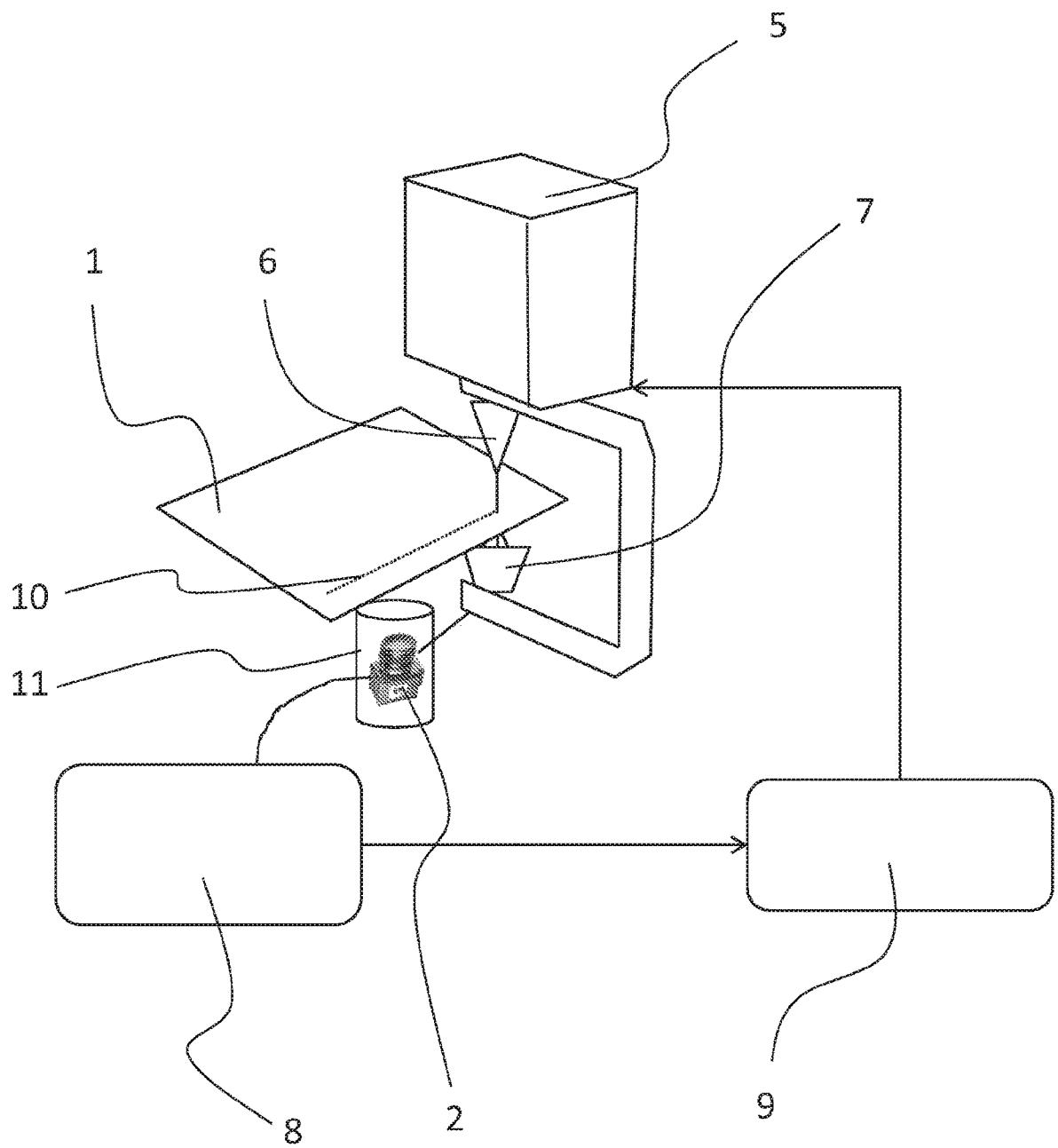
FIG. 1 shows a device, subject of the present invention, where the camera is mounted onto the collector of the water-jet cutting head.

FIG. 1 gives one example of a device of the invention.

In a known manner, in a cutting machine, a part made of composite material 1 is disposed on a support, not shown in FIG. 1, of the water-jet cutting machine 5, the cutting head 6 is on top of the material 1 and a collector 7 on top of the material 1.

A camera 2 is mounted underneath the composite material 1 near to the collector 7 so as to capture, at closely-spaced intervals of time, images of the cutting line 10. Closely-spaced intervals of time should be understood to mean that successive images must allow the cutting line 10 to be represented without interruption over its entire monitored length and a processing of the images to be provided for detecting the deviations whose amplitude is greater than the defined threshold within a timeframe coherent with the speed of divergence of the possible deviations.

The camera 2 is protected by a part 11.

The images captured by the camera 2 are processed as they are acquired, in as close to real time as possible in the sense that the processing is carried out without any delay other than the acquisition and digital processing times of the images, by a processing and analysis system 8 configured for identifying, by an analysis of the images, the cutting line 10, the cutting line 10 corresponding to the edge of the part 1, in order to calculate the amplitude of the deviations of the quality of the surface profile and to compare the deviation with a threshold value.

The camera 2 is held by the support in such a manner as to be fixed in a reference frame of the cutting head 6 and to observe the cut at a constant distance from the jet performing the cutting operation. In one embodiment, the part 1 is held immobile during the cutting operations and the camera 2 is installed so as to be mobile with the cutting head 6 that follows the theoretical path with respect to the part. In one embodiment, the part 1 is mobile and the cutting head is fixed, the camera 2 then also being fixed. In one embodiment, the cutting head is mobile along at least one displacement axis and the part is mobile along at least one other displacement axis, and in this case the camera 2 is mobile with the cutting head.

In one embodiment, the camera 2 comprises a degree of movement with respect to the cutting head in order to view a region of the part, which is not in the direction of the displacement. This possibility of modifying the position and/or the orientation of the camera with respect to the cutting head is advantageous for maintaining the cutting line within the field of the camera when the theoretical line determines a path for the cut with small radii of curvature in consideration of the region observed by the camera and, in particular, of the distance from this region to the location of the cutting jet. In such a configuration, the relative rotation of the part with respect to the cutting head/camera assembly is likely to make the field of the camera image stray from the cutting line.

A displacement of the camera 2 managed by the control system 9 allows the effect of this rotation to be compensated so as to maintain the cutting line within the field of the camera.

In another embodiment, the processing system 8 which analyzes the images returns a position of the cutting line in the image and sends a command to move the camera 2 so as to maintain the cutting line substantially at the center of the image.

The processing system 8 is connected to a control system 9 for the cutting machine 5 in such a manner as to stop the cutting operation if the amplitude of the deviations exceeds the threshold value.

The camera 2 is advantageously a digital camera, for example a CMOS image sensor or a CCD image sensor, made sufficiently robust to operate durably in the environment of the cutting machine implemented.

The camera 2 comprises means of communication, wired or wireless, for transmitting images acquired by the camera to the processing system 8.

A resolution of the images delivered by the camera will be chosen, as a function of characteristics of a set of optics associated with the image sensors in order to guarantee the detection of a minimum deviation that needs to be detected, typically a resolution at least twice as high as the smallest deviation to be detected.

It should be noted that, in the case described of a water-jet cutting technique, the cut forms a gap of the order of a millimeter and that the tolerance on the amplitude of the waviness and deviations is of the order of a tenth of a millimeter.

In one exemplary embodiment, the camera 2 is chosen with a ½ inch sensor and an image resolution of 10 megapixels and delivering at least 5 images per second, equipped with a lens preferably with a sufficient focal distance, for example 50 mm corresponding to a "small" telephoto lens for the size of sensor in question, to form the images from a distance ensuring the physical safety of the camera and with a sufficient magnification.

The camera 2 is, for example, an industrial 10 megapixels Gigabit Ethernet color camera from the company Bayer marketed under the reference IDS U0-54905E-C-HQ associated with CVO optics and a focal length of 50 mm, i.e., an aperture of 8.7° along a diagonal of the image delivered by the camera, referenced GM1OHR35028MCN.

Figure 2:
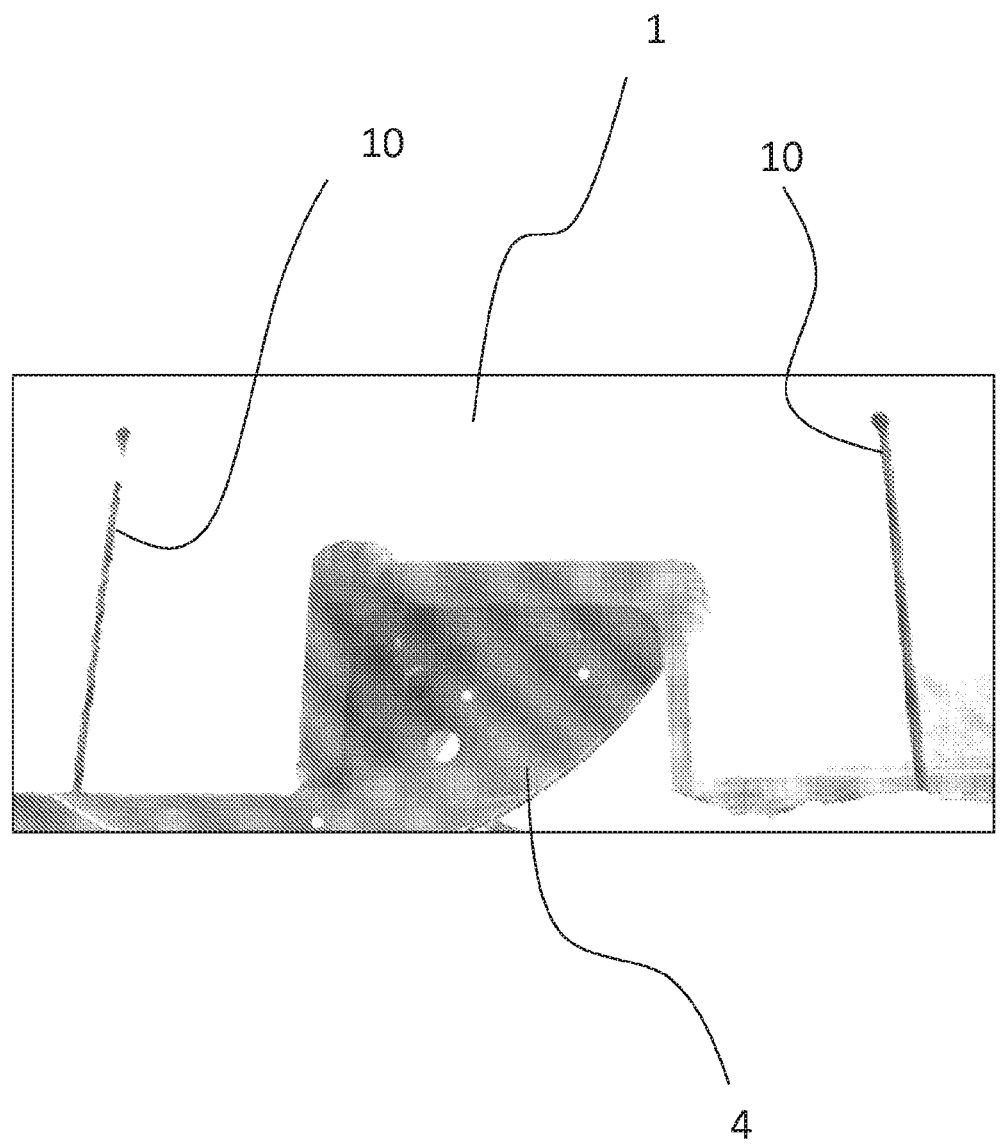
Figure 3:
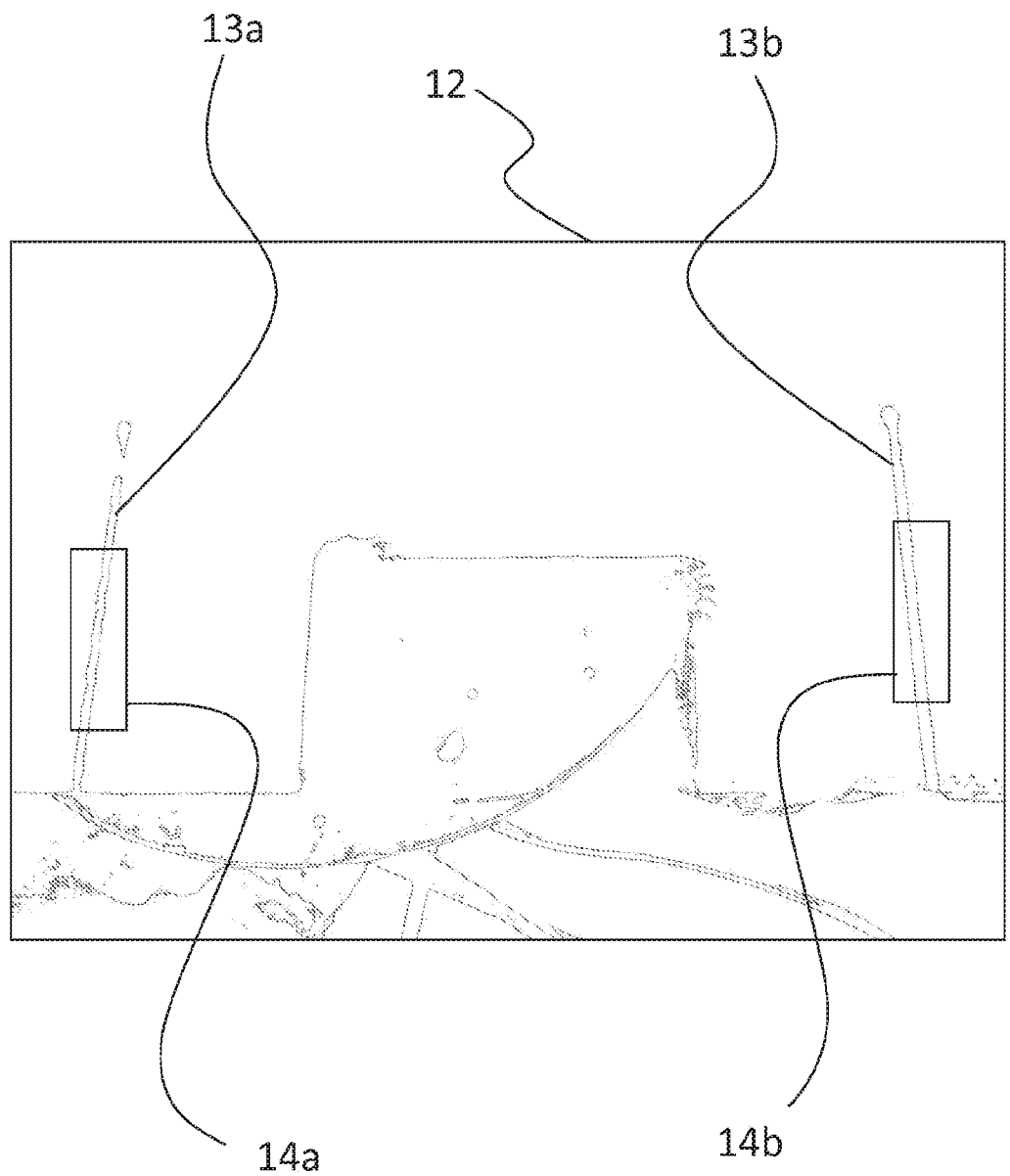

FIGS. 2 to 4 show schematically the steps of one exemplary embodiment of the method of the invention.

FIG. 2 shows two cutting lines 10 of the dual water-jet cutting out of the composite material 1 disposed on a support 4.

FIG. 3 shows the image 12 taken by the camera and processed by the analysis system for determining a pair 13a and 13b of edges of the cuts from the cutting lines 10 in FIG. 2.

Figures 4A, 4B:
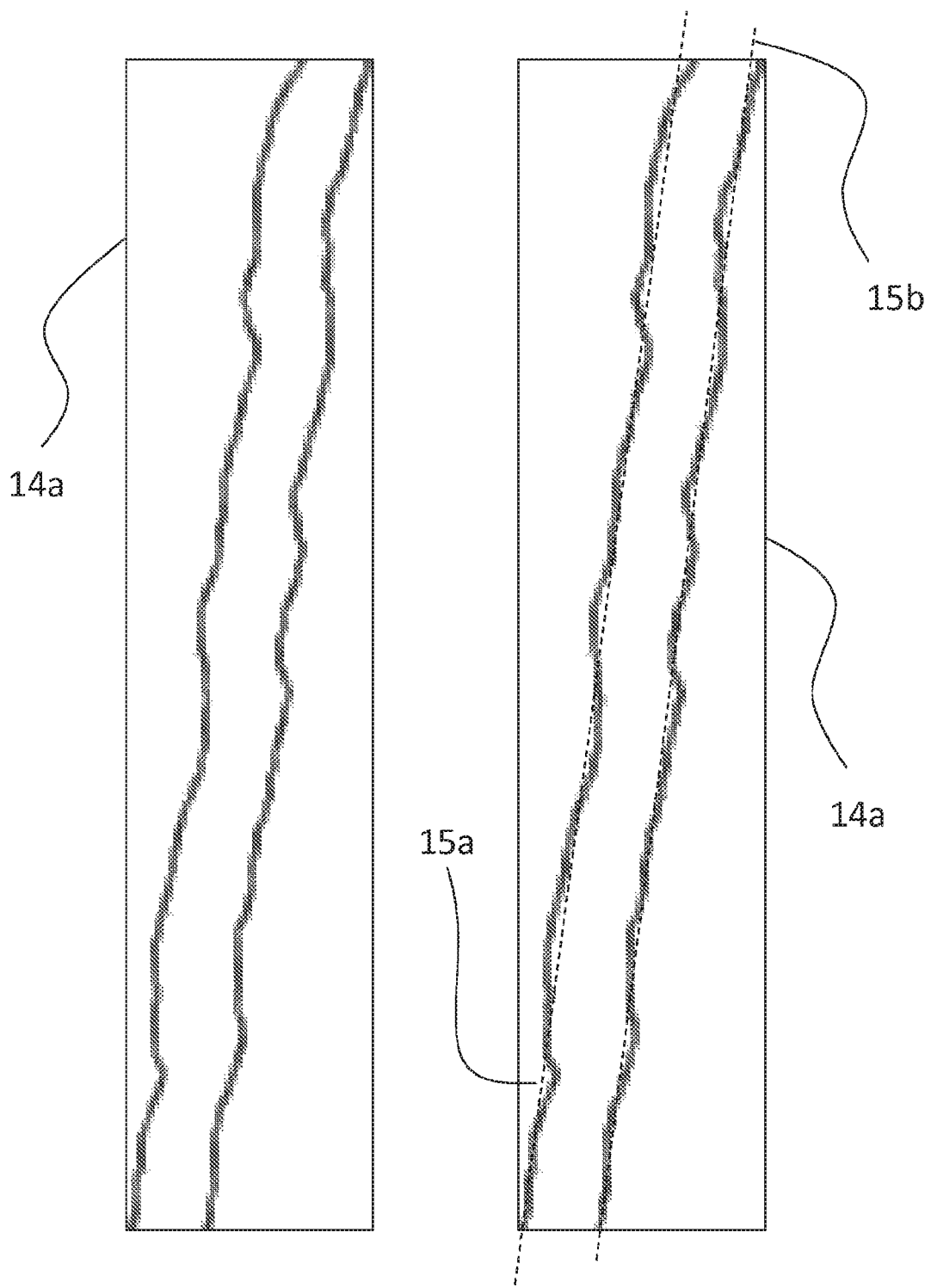

FIGS. 4a and 4b show the analysis of the surface profile of the portion 14a shown in FIG. 3 of the cut edge 13a. In FIG. 4b the lines 15a and 15b corresponding to the edges of the part are indicated as dashed lines in order to detect the potential deviation of the quality of the surface profile. When the deviation reaches a value greater than a given threshold, an alarm is triggered and/or the shutdown of the cutting operation is caused.

Figure 5A:
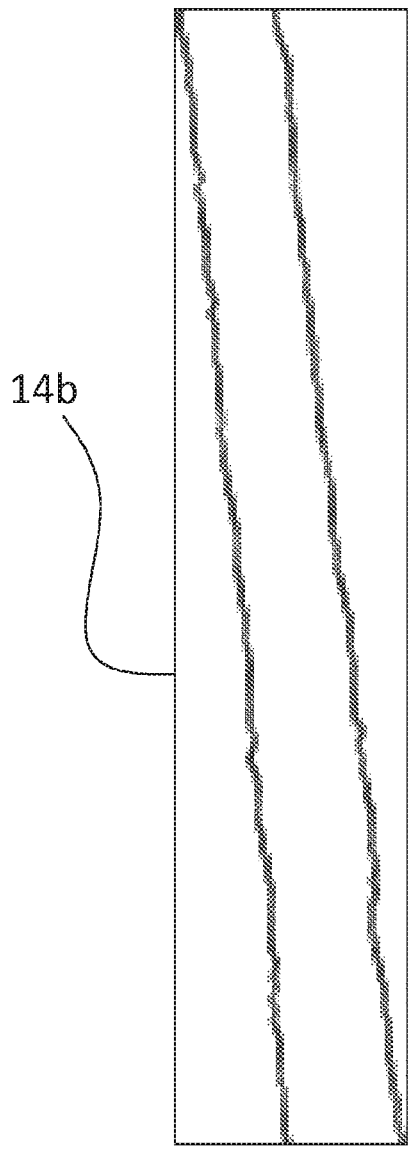
Figure 5B:
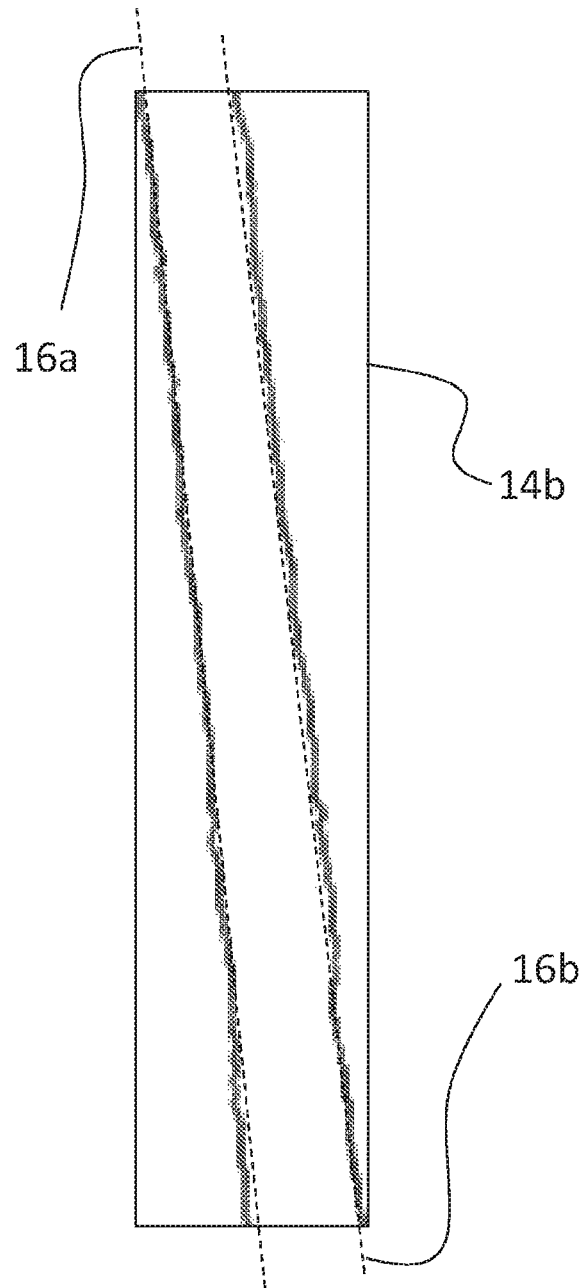

FIGS. 5a and 5b show the analysis of the surface profile of the portion 14b given in FIG. 3 of the cut edge 13b. In FIG. 5b the lines 16a and 16b corresponding to the edges of the parts are indicated as dashed lines in order to detect the potential deviation of the quality of the surface profile.

When the deviation reaches a value greater than a given threshold, an alarm is triggered and/or the shutdown of the cutting operation is caused.

It will be understood from FIGS. 4a, 4b, 5a and 5b that the cutting line 10 is not the axis of the region in which the material has been removed by the cut but, more precisely, one edge of this region, in particular the edge corresponding to the part 1 cut out. Where appropriate, when the region is sufficiently narrow in comparison with the amplitudes of the deviations and waviness which need to be detected, the axis of this region may coincide with the edge of the part.

According to the method, the image of the cutting line is preferably acquired as soon as possible, in other words in practice, as close as possible to the location where the cutting of the material takes place. In the example of the water-jet cutting technique, the images must be captured as close as possible to the location where the water jet passes through the part being cut out.

The closest location depends on the characteristics of the device performing the cut. On the one hand, the camera has to be located under conditions where it is sufficiently protected so as to deliver usable images. Where necessary, the camera, especially its lens, is protected by a screen or a filter whose transparency is guaranteed by a wiper system, not shown, for example the continuous sweeping of a wiper blade made of elastomer. On the other hand, the camera must be placed at a location and at an angle where the cutting line is effectively visible and does not risk being masked, for example by mist produced by the water jet carrying out the cutting or by an element accessory of the cutting system.

In view of the distance, resulting from these conditions, between the location where the effective cutting of the material is carried out and the location on the parts where the image of the cutting line is effectively acquired, the amplitudes of the deviations and waviness of the cutting line, determined by the device implementing the method, are determined with a delay, depending on the cutting speed, with respect to the moment when they are formed.

In order to take into account the delay, the values of thresholds of the deviations measured for which an alarm is generated and/or the cutting operation is interrupted are less than the maximum tolerated values so as to take into account a divergence in the amplitudes of the deviations during the cutting operation. At the most, these thresholds correspond to the tolerances, reduced by the measurement uncertainties, in the case where it is established or accepted that the divergence is very slow.

In one embodiment, the method comprises an initial step for characterizing the cutting device in order to determine a divergence coefficient of the deviations, for example by carrying out cutting operations on test samples or by look-up tables previously established that may for example use the total number of hours of operation of the machine performing the cut-out, which coefficient determines the thresholds to be used. This initial step is for example carried out periodically, for example prior to each cutting out of a series of parts or at intervals of a given number of hours of operation, so as to take into account the aging and the wear of the machine performing the cut out.

Advantageously, conditions, in particular of lighting and of spectral sensitivity of the camera, will be arranged so as to obtain a contrasted image of the cutting line which is subjected to an image processing algorithm in order to identify the geometry of the cutting line. The image processing algorithms carrying out the contour extractions, the shape recognitions and the calculations of dimensions are known and will be implemented by those skilled in the art for determining the deviations of the cutting line with respect to a theoretical line.

It should be noted that, in a general case, the cutting line is not necessarily rectilinear, at least over its entire length. The theoretical line taken into consideration for determining the amplitudes of the deviations of the cutting line is therefore that which corresponds to the contour specified for the parts and which, in the method, is known from the device since it determines the relative path that a cutting head 6 must follow with respect to the part.

Figure 6:
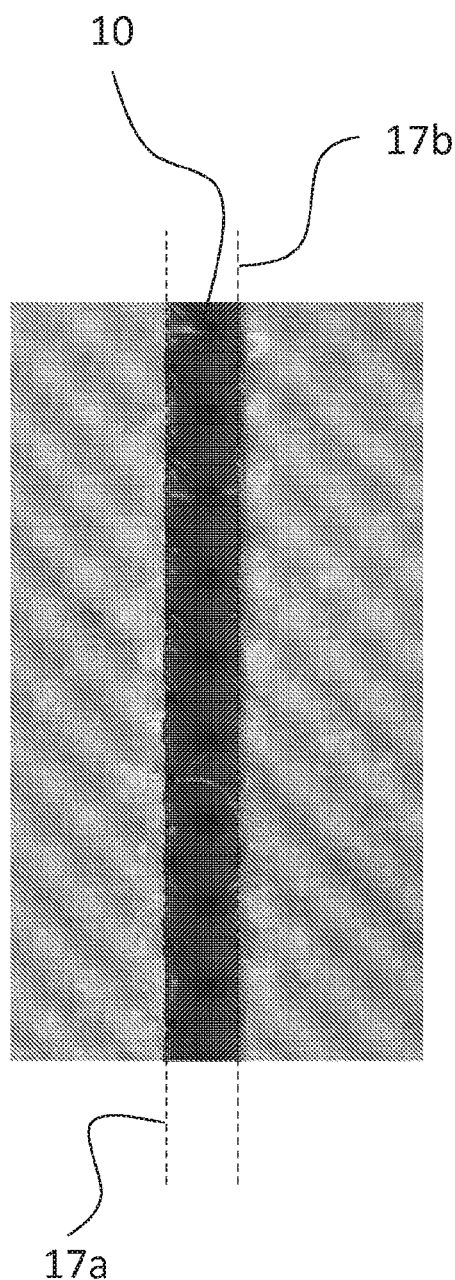
FIG. 6 shows a cutting line and the determination of the associated guide lines, FIG. 7 provides a graphical representation of the surface profiles for each of the edges of the cutting line.
Figure 7:
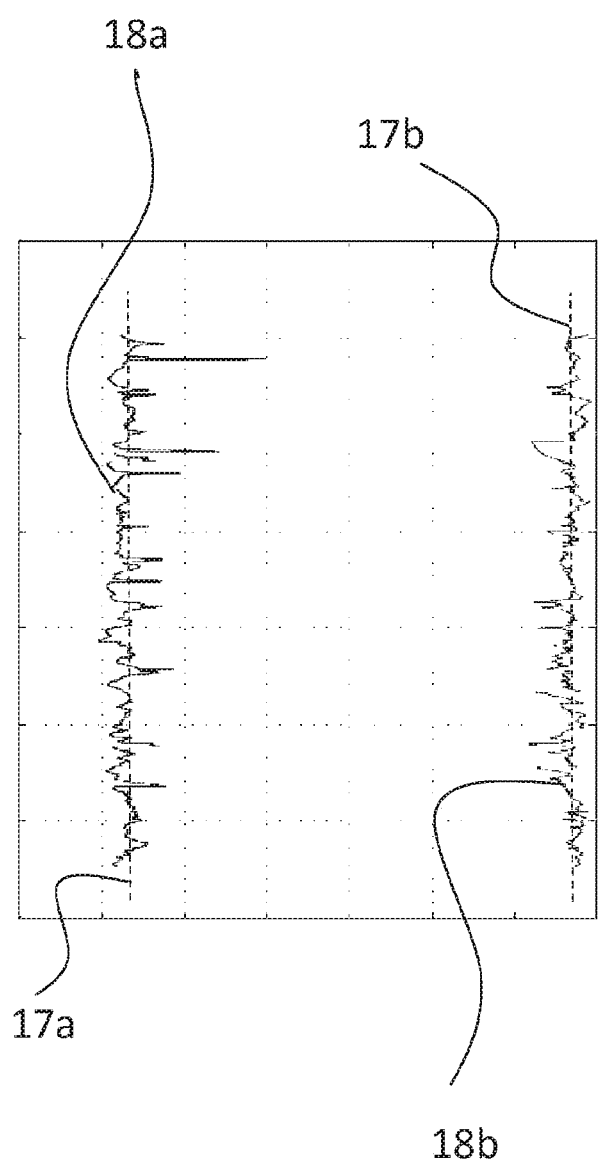

FIG. 6 shows a cutting line 10 and the determination of the associated guide lines represented by the dashed lines 17a and 17b. FIG. 7 provides a graphical representation of the surface profiles 18a and 18b for each of the edges of the cutting line 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for cutting materials by a cutting machine for a manufacture of parts cut out from the materials, comprising:
   capturing, by a camera, images of a cutting line in a recurrent manner downstream of a cutting head during a cutting operation,
   communicating the captured images to a processing system,
   analyzing, by the processing system, the images thus captured in real time in order to calculate amplitudes of deviations of the cutting line as the cutting out of the parts progresses and to compare said calculated amplitudes with at least one predefined threshold value,
   connecting the processing system to a control system of the cutting machine,
   stopping, by the control system, said cutting operation when said at least one threshold value is exceeded.

2. The method as claimed in claim 1, wherein the cutting is carried out by a water-jet technique.

3. The method as claimed in claim 2, wherein the cutting is carried out with an addition of abrasives.

4. The method as claimed in claim 1, wherein the part is made of a composite material.

5. The method as claimed in claim 1, wherein said at least one threshold value is predefined with respect to at least one of the following components of a state of a surface of the cutting line:
   primary shape defects which represent periodic components of long wavelength,
   waviness which represents periodic components of average wavelength,
   roughness which represents periodic and quasi-periodic components of short wavelength, micro-roughness which represents aperiodic components and corresponds to surface imperfections.

6. The method as claimed in claim 1, wherein said at least one threshold value is predefined with respect to at least one of the following components of a cutting line:
   a non-penetrating cut,
   too wide a cut,
   too narrow a cut.

7. The method as claimed in claim 1, wherein the analysis of the images produced comprises
   highlighting of contours of the cutting line,
   detecting the contours,
   determining a shape guide line known by virtue of a planned cut-out path, the calculation of the variations of the cutting line from the shape guide line based on a wavelength of the variations.

8. The method as claimed in claim 1, wherein the images are captured at intervals of time in a range between 0.01 seconds and 10 seconds.

9. The method as claimed in claim 1, wherein the cutting line is filmed or photographed from an underside.

10. An application of the method as claimed in claim 1 to the manufacture of parts made of composite materials involved in a composition of a fuselage or of wings of an aircraft.

11. A device comprising:
   a cutting machine with a cutting head, configured to cut out material along a cutting line,
   a camera disposed downstream of the cutting head in a direction of progression of a cutting line configured to capture images of said cutting line,
   a communication means configured to communicate the captured images to an analysis system,
      said analysis system configured to analyze the images captured with the camera,
      said analysis system being connected to a control system of the cutting machine in such a manner as to cause instantaneous shutdown of the cutting machine.

12. The device as claimed in claim 11, wherein the camera is disposed in such a manner as to capture images from an underside of the cutting line.

13. The device as claimed in claim 11, further comprising illumination apparatus.

14. The device as claimed in claim 11, further comprising apparatus to enhance a contrast of the images captured.

15. The device as claimed in claim 11, further comprising protection apparatus for the camera.

* * * * *